US008856356B2

(12) United States Patent
Zitnik et al.

(10) Patent No.: US 8,856,356 B2
(45) Date of Patent: Oct. 7, 2014

(54) NON-IMS RICH COMMUNICATION SUITE

(71) Applicants: Stephan J. Zitnik, Fort Myers, FL (US); Steven D. Aubin, Fort Myers, FL (US); Roy Benton Rigas, Fort Myers, FL (US); Joshua J Wigginton, Fort Myers, FL (US)

(72) Inventors: Stephan J. Zitnik, Fort Myers, FL (US); Steven D. Aubin, Fort Myers, FL (US); Roy Benton Rigas, Fort Myers, FL (US); Joshua J Wigginton, Fort Myers, FL (US)

(73) Assignee: Interop Technologies, LLC, Fort Myers, FL (US)

( * ) Notice: Subject to any disclaimer, the term of this patent is extended or adjusted under 35 U.S.C. 154(b) by 0 days.

(21) Appl. No.: 13/676,709

(22) Filed: Nov. 14, 2012

(65) Prior Publication Data

US 2014/0134978 A1   May 15, 2014

Related U.S. Application Data

(63) Continuation of application No. PCT/US2012/059320, filed on Oct. 9, 2012.

(60) Provisional application No. 61/544,385, filed on Oct. 7, 2011.

(51) Int. Cl.
*G06F 15/16* (2006.01)
*H04L 29/06* (2006.01)
*H04L 29/00* (2006.01)
*H04L 7/00* (2006.01)
*H04L 12/00* (2006.01)
*H04L 12/22* (2006.01)

(52) U.S. Cl.
CPC .......... *H04L 29/06319* (2013.01); *H04L 29/00* (2013.01); *H04L 29/06* (2013.01); *H04L 7/00* (2013.01); *H04L 12/00* (2013.01); *H04L 12/22* (2013.01)
USPC ........... 709/227; 709/201; 709/217; 709/230; 709/238; 370/229; 455/445

(58) Field of Classification Search
USPC ........... 709/201, 217, 227, 230, 238; 370/229
See application file for complete search history.

(56) References Cited

U.S. PATENT DOCUMENTS

| | | | | |
|---|---|---|---|---|
| 7,529,813 | B2 * | 5/2009 | Lim et al. ........................ | 709/219 |
| 8,051,208 | B2 * | 11/2011 | Wang et al. .................... | 709/246 |
| 8,285,983 | B2 * | 10/2012 | Hallenstal et al. ............. | 713/151 |
| 8,358,616 | B2 * | 1/2013 | Shan et al. ...................... | 370/329 |
| 2005/0243746 | A1 * | 11/2005 | Mutikainen et al. ........... | 370/282 |
| 2009/0168985 | A1 | 7/2009 | Yu et al. | |
| 2011/0116419 | A1 | 5/2011 | Cholas et al. | |
| 2011/0165856 | A1 | 7/2011 | You et al. | |
| 2011/0165857 | A1 | 7/2011 | Pihlamajamaki et al. | |
| 2011/0231544 | A1 | 9/2011 | Javenpaa et al. | |
| 2011/0249650 | A1 | 10/2011 | Seppanen et al. | |
| 2012/0096115 | A1 | 4/2012 | McColgan et al. | |
| 2012/0144048 | A1 | 6/2012 | Jarvenpaa et al. | |

* cited by examiner

*Primary Examiner* — Michael Y Won
(74) *Attorney, Agent, or Firm* — Todd L. Juneau

(57) ABSTRACT

This invention relates to telecommunications, and in particular, to a Rich Communication Suite (RCS) and RCS-e ("e" for enhanced) messaging infrastructure within a network without the need to deploy an IP Multimedia Subsystem (IMS) core within the network.

1 Claim, 5 Drawing Sheets

NON-IMS RICH COMMUNICATION SUITE

CROSS REFERENCE TO RELATED APPLICATIONS

This application claims priority benefit under 35 USC 111(a) to International application PCT/US2012/059320, and thereby under 35 USC 119(e) to U.S. provisional 61/544,385 filed Oct. 7, 2011, the contents of which are incorporated herein in their entirety.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

BACKGROUND

Field of the Invention

This invention relates to telecommunications, and in particular, to a Rich Communication Suite (RCS) and RCS-e ("e" for enhanced) messaging infrastructure within a network without the need to deploy an IP Multimedia Subsystem (IMS) core within the network.

In a standard RCS with IMS core there is architectural framework for delivering IP multimedia services. The idea is that mobile customers can use instant messaging (IM), live video sharing and file transfer simultaneously during calls across any device on any network operator in a simple and intuitive way. Wireless operators today face increasing threats to their text and video revenue streams. Over-the-top (OTT) providers of Instant Messaging (IM) and IM-like clients and servers have been able to utilize the operator's IP backbone to provide a more rich, if closed, messaging experience that is often free to the end user. As the proliferation of these types of services increases, subscribers may indeed choose OTT services over the operator's traditional SMS and MMS offerings, severely threatening messaging revenues.

Most operators today are advancing plans to roll out a new generation of IP-based messaging infrastructure based on the RCS or RCS-e protocols. These standards offer the end user a more robust user experience, providing features such as file transfer and group chat that are not available using today's SMS and MMS technologies. These in-demand, rich communication features compete favorably with OTT offerings.

The RCS and RCS-e standards, however, require service providers to have an IMS core within their network. In many cases, the engineering, deployment, turn up, and testing of the IMS core is delaying the deployment of RCS clients in the network, enabling the OTT providers to gain mind and market share. In the face of increasing competition, this delay is augmenting the risk to operator revenue. In a standard RCS system, an operator is required to buy an IMS Core and to buy an RCS server. For a small operator, e.g. 5 million subscribers, an IMS core can cost several million dollars and take about 18-24 months to get up and running.

Regarding RCS, U.S. published application 2012/0096115 to McColgan et al. discloses a method of using a control circuit to extend presence information by including a service identifier element in the presence information, wherein the service identifier element identifies a suite of services, where corresponding presence information includes a service identifier element transmitted to a watcher, and where the presence information further includes a version element defining a version of the suite of services, and includes a description element that is a human readable string of characters that provides information about the suite of services.

Related RCS applications include U.S. published application 2011/0165857 to Pihlajamaki et al. discloses a better method to manage and charge a user for presence information, U.S. published application 2011/0231544 to Javenpaa et al. ("Providing a Presence Service in a Communication System") and U.S. 2011/0249650 to Seppanen et al. that discloses a method of using a circuit switched call with a packet switched media communication.

Regarding IMS, U.S. published application 2011/0116419 to Cholas et al. discloses implementation of an IMS voice-video mail service over a home network. U.S. published application US 2009/0168985 to Yu et al. discloses a communication system for an Internet Protocol Multimedia Subsystem (IMS)-based three way call including a mobile station (MS) that receives an invitation to participate in a call determines to switch the call to a three way call where the MS conveys a request to an IMS network to switch the call to a conference call, and an IMS network server receives the request, determines a unique identifier for the conference call, and provides the conference call identifier to the MS via one or more of a Session Initiation Protocol Refer message, Message message, and Notify message, and where in response to receiving the conference call identifier, the MS dials into the conference call and requests that the call originator also dial in, where the IMS network server then requests that the call originator dial in, and the call originator does so in response to the request.

Accordingly, there is a need for an operator to be able to provide RCS services without waiting for the installation of an IMS core, and to provide IMS core functionality with just an RCS server. There is also a need to be able to deploy a system within hours without requiring the usual 18-24 months to set up a standard RCS system.

BRIEF SUMMARY OF THE INVENTION

Provided herein is a fully developed RCS/RCS-e compliant infrastructure that does not require a full IMS deployment within the operator network. By incorporating the signaling, authorization, and session set up necessary to support RCS directly into the RCS/RCS-e platform itself, operators can provide the full RCS experience immediately while they await deployment of, or as a substitute for, their IMS cores. As an additional benefit, the RCS infrastructure provides full backwards compatibility with legacy messaging technologies, ensuring a ubiquitous user experience.

In a preferred embodiment, there is provided a non-IMS RCS system comprising four logical entities, the first logical entity is a protocol conversion gateway (PCG), the second logical entity is a session controller (SC), the third logical entity is a control node (CN), and the fourth logical entity is a subscriber and routing database (DB or SRDB), wherein said logical entities function in operative association with a telecommunication network having a plurality of user agents, a home location register (HLR) and one or more legacy controllers selected from a short messaging service center (SMSC) and a multimedia messaging service center (MMSC).

In another preferred embodiment of the invention, there is provided a non-IMS RCS telecommunication system comprising four logical entities, the first logical entity is a protocol conversion gateway (PCG), the second logical entity is a session controller (SC), the third logical entity is a control node (CN), and the fourth logical entity is a subscriber and routing database (DB or SRDB), wherein said logical entities function in operative association with a telecommunication network having a plurality of user agents, a home location register (HLR) and one or more legacy controllers selected from a short messaging service center (SMSC) and a multimedia messaging service center (MMSC) to transmit a message from a first subscriber to a second subscriber over the telecommunication network, wherein the protocol conversion gateway (PCG) handles the conversion from RCS/MSRP traffic to legacy SMPP or MM4/MM7 for delivery to SMSCs and/or MMSCs, wherein the PCG acts as an RCS client to the Session Controller and as an ESME to the legacy SMSC/MMSC infrastructure, wherein the session controller(s) is responsible for the set up and control of MRSP sessions in the RCS ecosystem, wherein the control node handles the signaling interfaces, including both SIP and SS7, necessary to handle the registration, session set up, and subscriber authentication, wherein the control node acts in the IMS infrastructure as both the proxy call session control function (P-CSCF) and the serving call session control function (S-CSCF), wherein the control node acts as the application controller for RCS, and wherein the SRDB acts as the home subscriber server (HSS) in the IMS infrastructure and holds the individual handset capability information garnered in the registration process, as well as any operator- or handset-specific routing information.

In another preferred embodiment, there is provided a non-IMS RCS method for delivering messages between an RCS client and a RCS client.

In another preferred embodiment, there is provided a non-IMS RCS method for delivering messages between a legacy messaging client and an RCS client.

In another preferred embodiment, there is provided a non-IMS RCS method for delivering messages between an RCS client and a legacy messaging client.

DETAILED DESCRIPTION OF THE INVENTION

As provided herein, the inventive subject matter relates to a fully developed RCS/RCS-e compliant infrastructure that does not require a full IMS deployment within the operator network. By incorporating the signaling, authorization, and session set up necessary to support RCS directly into the RCS/RCS-e platform itself, operators can provide the full RCS experience while they continue deployment of, or as a substitute for, their IMS cores. As an additional benefit, the invention infrastructure provides full backwards compatibility with legacy messaging technologies, ensuring a ubiquitous user experience.

Registration

Figure 1:
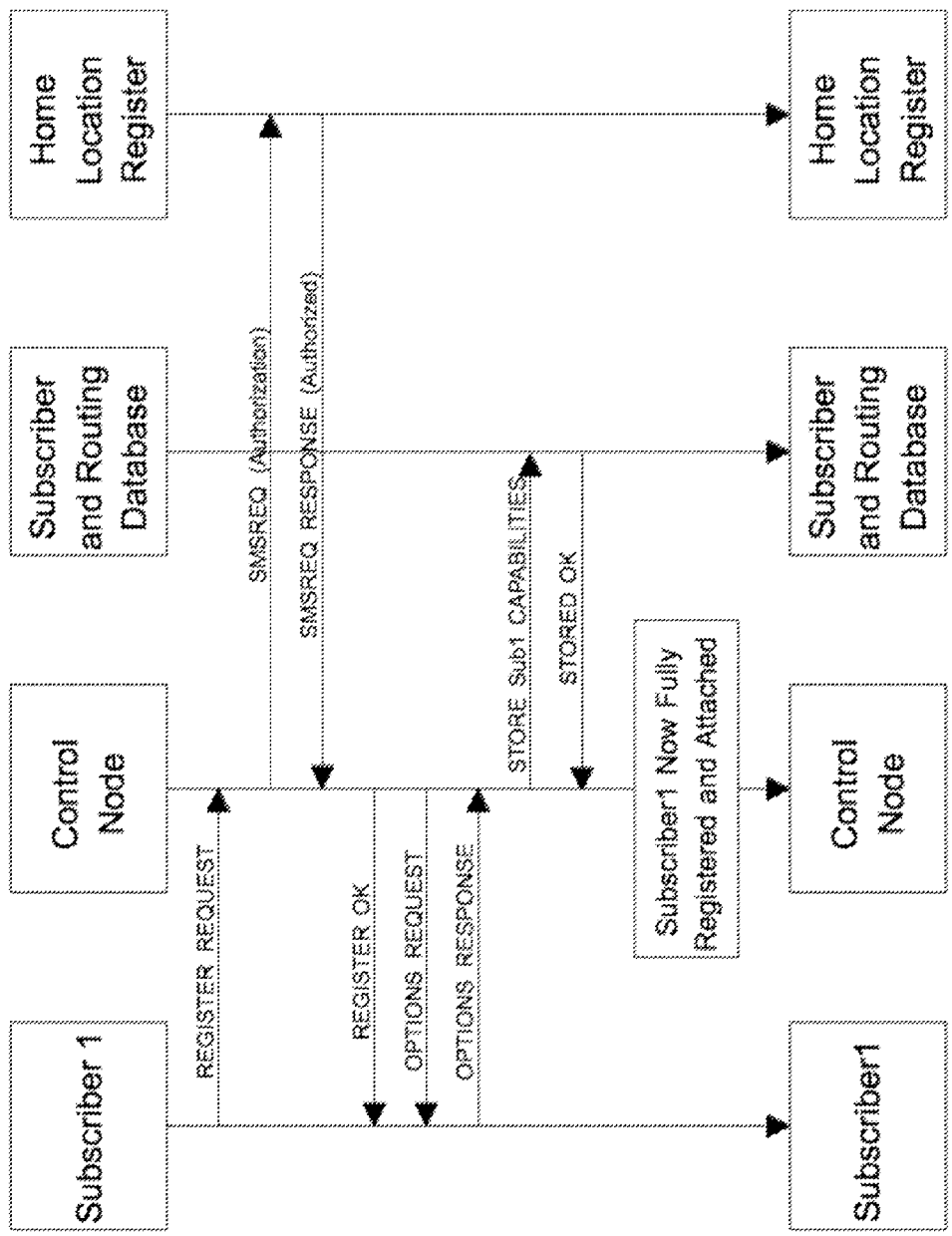
FIG. 1 is a block diagram showing in a non-limiting example the IMS registration process for capture of the subscriber handset capabilities and to authenticate the subscriber.

Referring now to FIG. 1, there is exemplified a system where additional steps have been added to the IMS registration process to facilitate the capture of the handset capabilities at the time of registration and authenticate the subscriber. Once the RCS client is configured using the RCS platform as its IMS core, no additional client functionality is required to facilitate this change in normal IMS signaling flow.

At the time of handset registration, the RCS client goes through its normal registration process. These messages are sent directly to the RCS core and are responded to in the normal fashion. The additional step in the registration call flow is the inclusion of the SIP OPTIONS message. Immediately upon receipt and acknowledgment of the registration event, the RCS core will send an OPTIONS message to the registered handset. This will cause the target handset to return its capabilities, which will be stored in a routing database internal to the system. This information will be stored with the purpose of identifying which devices are RCS capable in the operator's network. Concurrently, an SMSREQ or SRI message will be sent to the appropriate HLR in order to validate the subscriber as authorized to receive messaging. Once these steps have been performed, the handset will be considered fully registered and attached to the RCS core.

System Architecture

Figure 2:
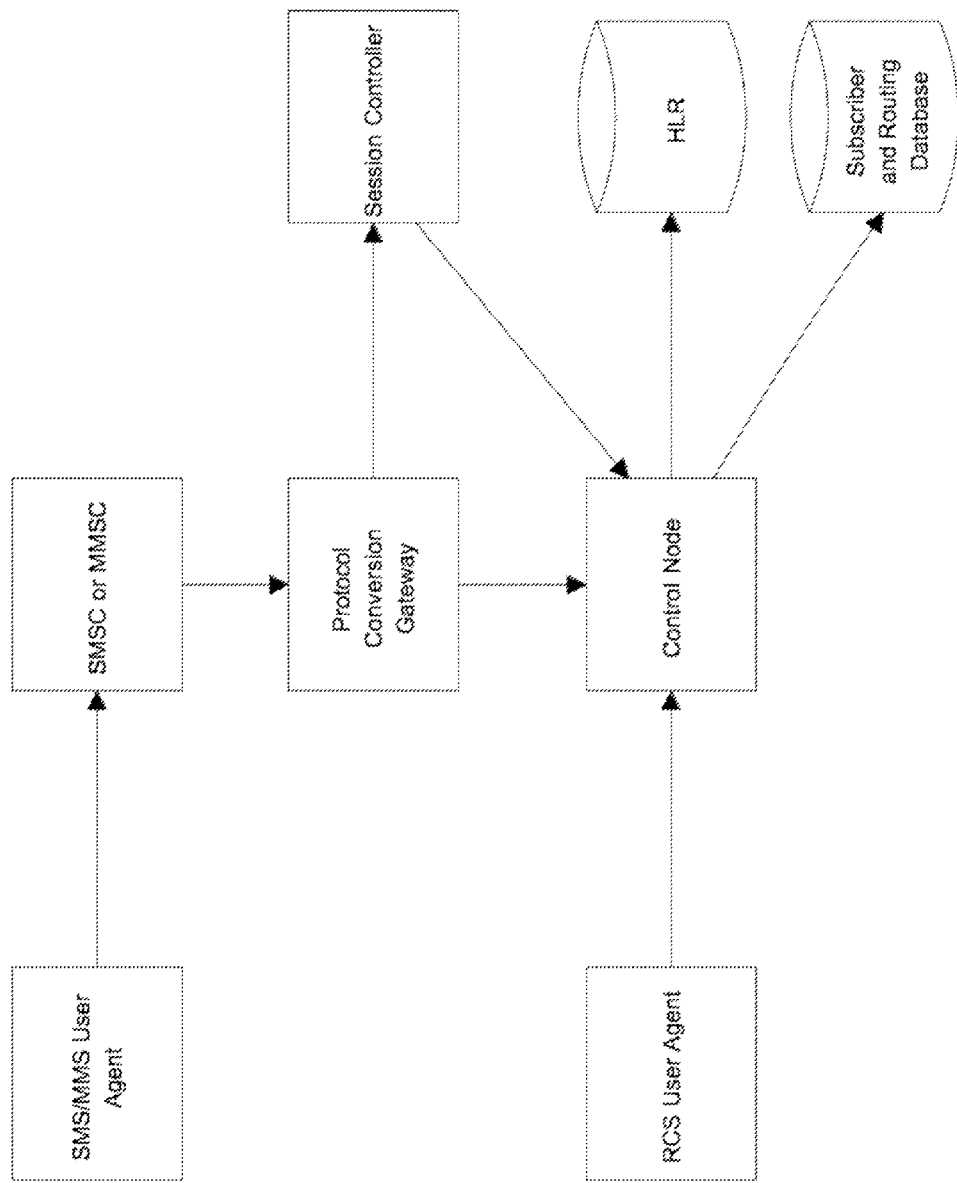
FIG. 2 is a block diagram showing in a non-limiting example the system architecture and how the four inventive logical entities interact within a network environment having operator user agents, operator short and/or multimedia messaging service centers, and operator home location registration router(s).

Referring now to FIG. 2, the invention in one preferred embodiment of the RCS w/o IMS solution consists of 4 logical entities. Together these provide the necessary signaling, resource management, authentication, and backwards compatibility required for a complete RCS-e implementation.

FIG. 2 illustrates the network elements as follows:

A. Control Node

The control node handles the signaling interfaces (both SIP and SS7) necessary to handle the registration, session set up, and subscriber authentication. It acts in the IMS infrastructure as both the P-CSCF and the S-CSCF. Additionally it acts as the application controller for RCS.

B. Session Controllers

The session controllers are responsible for the set up and control of MRSP sessions in the RCS ecosystem.

C. Subscriber and Routing Database (SRDB)

The SRDB acts as the HSS in the IMS infrastructure. It holds the individual handset capability information garnered in the registration process, as well as any operator- or handset-specific routing information.

D. Protocol Conversion Gateway

The protocol conversion gateway handles the conversion from RCS/MSRP traffic to legacy SMPP or MM4/MM7 for delivery to SMSCs and/or MMSCs. The gateway acts as an RCS client to the Session Controller and as an ESME to the legacy SMSC/MMSC infrastructure.

Messaging Call Flows

Figure 3:
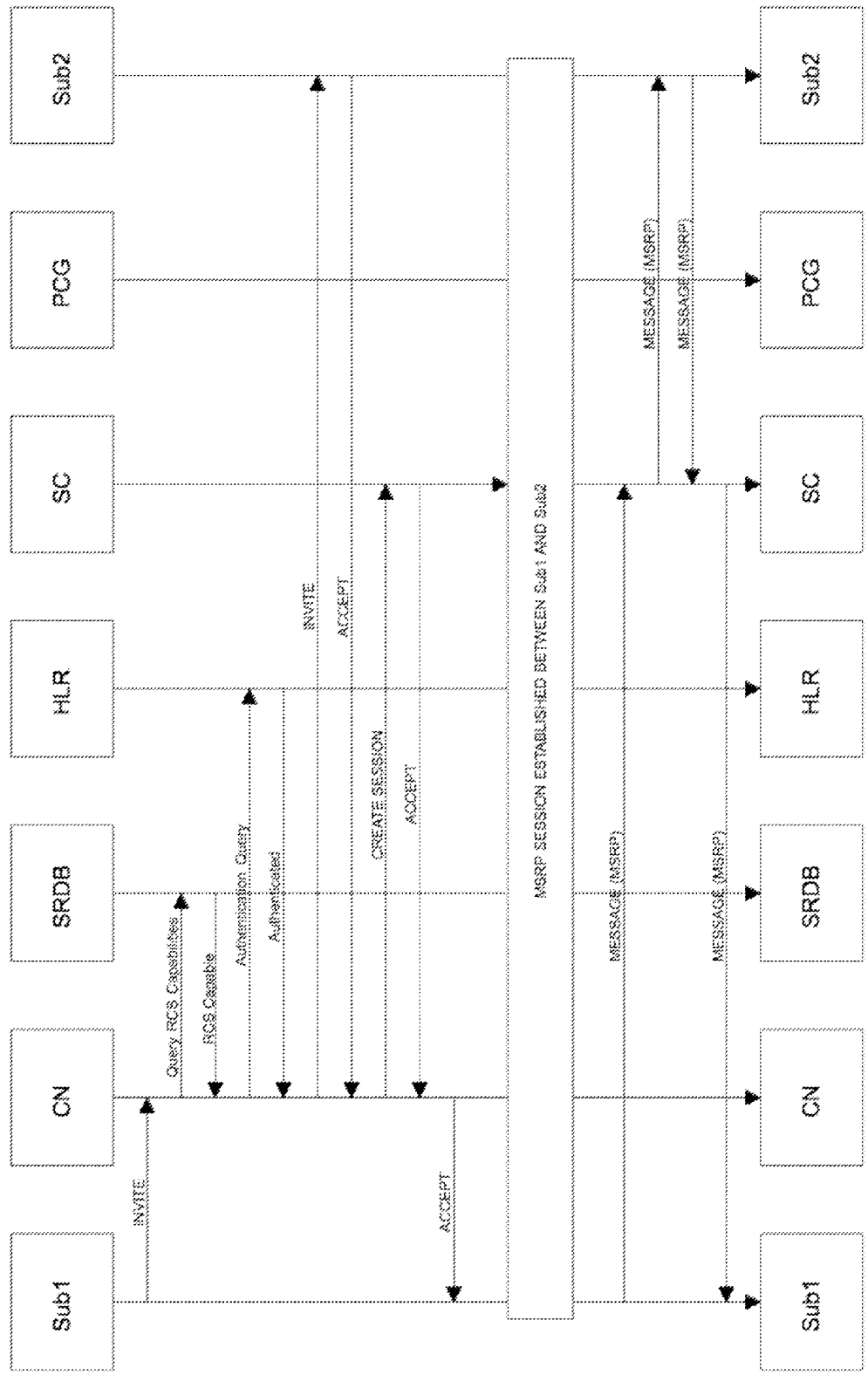
FIG. 3 is a block diagram showing in a non-limiting example the normal flow for RCS to RCS messaging.

Referring now to FIG. 3, RCS to RCS Messaging is illustrated.

This call flow describes the normal flow for RCS to RCS messaging. The four logical entities of the RCS/IMS platform are:

Control Node (CN)
    Session Controller (SC)
    Subscriber and Routing Database (SRDB)
    Protocol Conversion Gateway (PCG)
    Also pictured are two subscribers (Sub 1 and Sub 2), as well as a preexisting operator HLR.

Step 301. Subscriber 1 sends an INVITE to the CN (acting as the CSCF) to request an RCS session with Subscriber 2.

Step 302. The CN queries the SRDB to determine whether or not the target handset is RCS capable. (This data is populated per the registration call flow above.)

Step 303. Once the target handset is deemed RCS capable, an HLR query (or other external system as necessary) is performed to authenticate both the invitee and invited parties.

Step 304. Assuming both queries are validated, the CN forwards the INVITE to Subscriber 2.

Step 305. Subscriber 2's RCS client issues an ACCEPT Message to the CN.

Step 306. CN issues a CREATE SESSION command to the SC.

Step 307. SC issues an ACCEPT message back to the CN.

Step 308. CN forwards ACCEPT message to Subscriber 1.

Step 309. Subscriber 1 and Subscriber 2 exchange messages over MRSP via the SC.

Legacy to RCS Messaging

Figure 4:
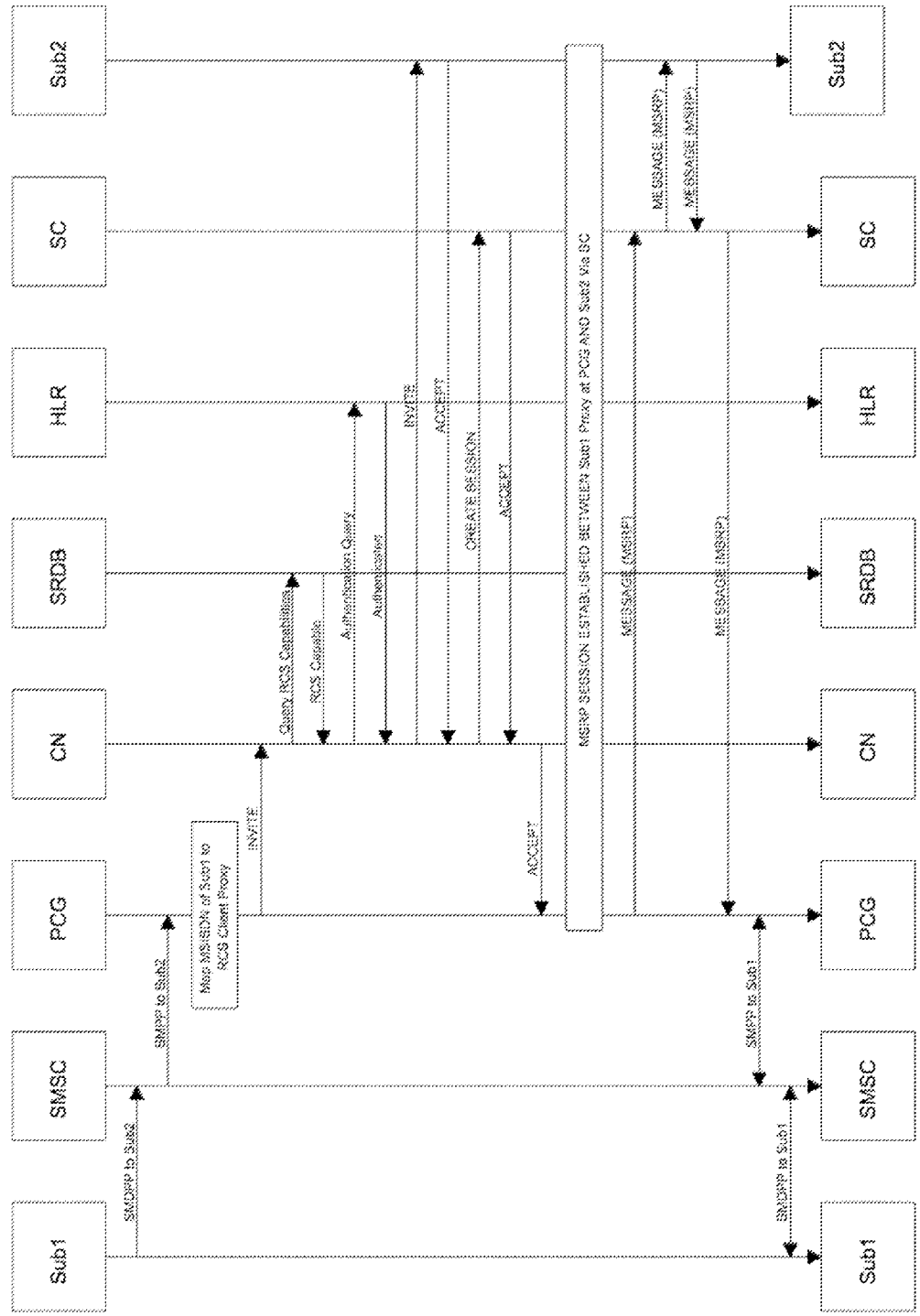
FIG. 4 is a block diagram showing in a non-limiting example the normal flow for Legacy SMS to RCS messaging.

Referring now to FIG. 4, this call flow describes the normal flow for legacy SMS to RCS messaging. It should be recognized that although the example used here is SMS, the call flow and call set procedures are identical between SMS and MMS. The protocol used to deliver to/from the legacy infrastructure would simply be MM4 or MM7.

The four logical entities of the RCS/IMS platform are:
Control Node (CN)
Session Controller (SC)
Subscriber and Routing Database (SRDB)
Protocol Conversion Gateway (PCG)
Also pictured are two subscribers (Sub 1 and Sub 2), as well as a preexisting operator HLR and SMSC. SUB 1 in this case is utilizing traditional SMS.

Step 401. Subscriber 1 uses a traditional messaging client to send an SMDPP message to the SMSC for delivery to Subscriber 2.

Step 402. SMSC forwards an SMPP message to the PCG for delivery.

Step 403. PCG assigns a mapping of the MISDN to one of its RCS client proxy.

Step 404. PCG sends an INVITE to the CN (acting as the CSCF) to request an RCS session with Subscriber 2.

Step 405. CN queries the SRDB to determine if the target handset is RCS capable. (This data is populated per the registration call flow above.)

Step 406. Once the target handset is deemed RCS capable, an HLR query (or other external system as necessary) is performed to authenticate both the invitee and invited parties.

Step 407. Assuming both queries are validated, the CN forwards the INVITE to Subscriber 2.

Step 408. Subscriber 2's RCS client issues an ACCEPT message to the CN.

Step 409. CN issues a CREATE SESSION command to the SC.

Step 410. SC issues an ACCEPT message back to the CN.

Step 411. CN forwards ACCEPT message to PCG.

Step 412. Subscriber 2 and PCG communicate over MRSP via the SC, which are then forwarded over SMPP to the SMSC for delivery to Subscriber 1.

RCS to Legacy Messaging

Figure 5:
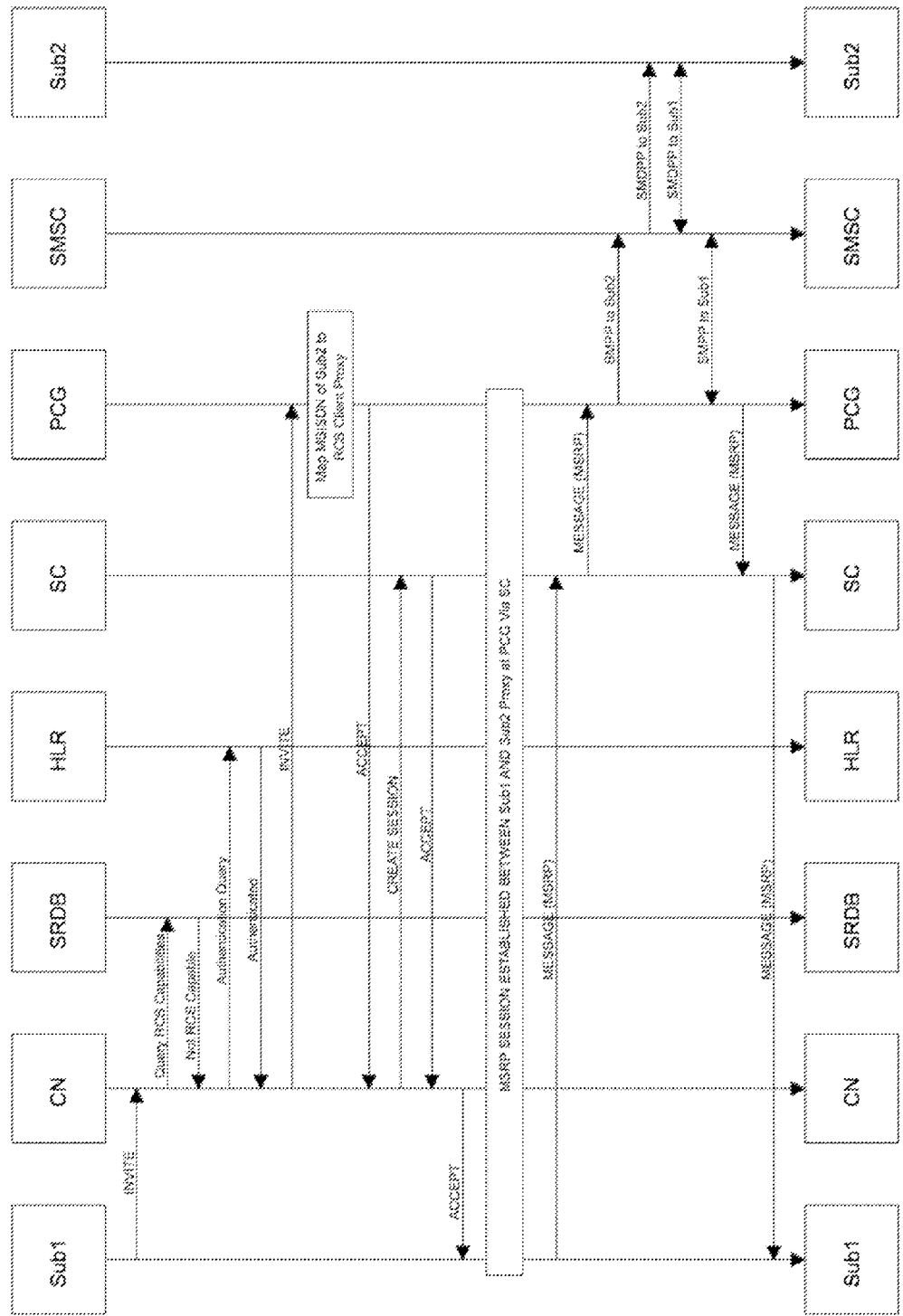
FIG. 5 is a block diagram showing in a non-limiting example the normal flow for RCS to Legacy messaging.

Referring now to FIG. 5, this call flow describes the normal flow for an RCS client to a legacy messaging client. It should be recognized that although the example used here is SMS, the call flow and call set procedures are identical between SMS and MMS. The protocol used to deliver to/from the legacy infrastructure would simply be MM4 or MM7.

The four logical entities of the RCS/IMS platform are:
Control Node (CN)
Session Controller (SC)
Subscriber and Routing Database (SRDB)
Protocol Conversion Gateway (PCG)
Also pictured are two subscribers (Subscriber 1 and Subscriber 2), as well as a preexisting operator HLR. SUB 2 in this case is utilizing traditional SMS.

Step 501. Subscriber 1 sends an INVITE to the CN (acting as the CSCF) to request an RCS session with Subscriber 2.

Step 502. CN queries the SRDB to determine if the target handset is RCS capable. In this case it is determined that the target handset it not RCS capable.

Step 503. Once the target handset is deemed NOT to be RCS capable, an HLR query (or other external system as necessary) is performed to authenticate the invitee.

Step 504. Assuming the query is validated, the CN forwards the INVITE to the PCG.

Step 505. The PCG proxy RCS client issues an ACCEPT message to the CN.

Step 506. CN issues a CREATE SESSION command to the SC.

Step 507. SC issues an ACCEPT message back to the CN.

Step 508. CN forwards ACCEPT message to PCG.

Step 509. Subscriber 1 and PCG exchange messages over MRSP via the SC, with the PCG forwarding/receiving message from the legacy infrastructure over SMPP.

The functional entities within the system illustrated herein may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions.

The functional entities may be implemented as separate computer programs or as a single computer program comprising several routines or functions implementing the entities. The program blocks are stored on at least one computer readable medium such as, for example, a memory circuit, memory card, magnetic or optic disk. Some functional entities may be implemented as program modules linked to another functional entity. The functional entities may also be stored in separate memories and executed by separate processors, which communicate, for example, via a message bus or an internal network within the network node.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

The components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Nonvolatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

What claim:

1. A non-IMS RCS telecommunications system comprising four logical entities, the first logical entity is a protocol conversion gateway (PCG), the second logical entity is a session controller (SC), the third logical entity is a control node (CN), and the fourth logical entity is a subscriber and routing database (DB or SRDB), wherein said logical entities function in operative association with a telecommunication network having a plurality of user agents, a home location register (HLR) and one or more legacy controllers selected from a short messaging service center (SMSC) and a multimedia messaging service center (MMSC) to transmit a message from a first subscriber to a second subscriber over the telecommunication network, wherein the protocol conversion gateway (PCG) handles the conversion from rich communication services/message session relay protocol (RCS/MSRP) traffic to legacy short message peer to peer (SMPP) or multimedia messaging service standard 4/multimedia messaging service standard 7 (MM4/MM7) for delivery to SMSCs and/or MMSCs, wherein the PCG acts as an RCS client to the Session Controller and as an external short message entity (ESME) to the legacy SMSC/MMSC infrastructure, wherein the session controller(s) is responsible for the set up and control of MSRP sessions in the RCS ecosystem, wherein the control node handles the signaling interfaces, including both SIP and SS7, necessary to handle the registration, session set up, and subscriber authentication, wherein the control node acts in the IMS infrastructure as both the proxy call session control function (P-CSCF) and the serving call session control function (S-CSCF), wherein the control node acts as the application controller for RCS, and wherein the SRDB acts as the home subscriber server (HSS) in the IMS infrastructure and holds the individual handset capability information garnered in the registration process, as well as any operator- or handset-specific routing information.

* * * * *